(12) United States Patent
Takasaki et al.

(10) Patent No.: US 6,484,342 B2
(45) Date of Patent: Nov. 26, 2002

(54) FUEL SUPPLY DEVICE FOR DIRECT INJECTION ENGINE

(75) Inventors: Nobuaki Takasaki, Hiroshima (JP); Tsuyoshi Goto, Hiroshima (JP); Isao Shimizu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/757,853

(22) Filed: Jan. 10, 2001

(65) Prior Publication Data

US 2001/0013336 A1 Aug. 16, 2001

(30) Foreign Application Priority Data

Jan. 14, 2000 (JP) ........................................ 2000-005577

(51) Int. Cl.[7] .............................................. F02M 37/04
(52) U.S. Cl. ........................... 12/495; 123/508; 123/509
(58) Field of Search ........................ 123/90.23, 179.17, 123/184.25, 184.38, 445, 456, 468, 469, 470, 472, 495, 508, 509, 510, 511, 514, 591, 406.47; 417/279, 282, 493, 505, 439

(56) References Cited

U.S. PATENT DOCUMENTS 5,005,534 A * 4/1991 Washizu et al. ......... 123/52 M
5,230,613 A * 7/1993 Hilsbos et al. ............... 417/439
6,050,236 A * 4/2000 Sawaki et al. .......... 123/195 C
6,138,641 A * 10/2000 Moser ........................ 123/456

FOREIGN PATENT DOCUMENTS

JP         08-312502        11/1996

* cited by examiner

Primary Examiner—Tony M. Argenbright
Assistant Examiner—Rebecca A Smith
(74) Attorney, Agent, or Firm—Brooks & Kushman, P.C.

(57) ABSTRACT

A high-pressure fuel pump is provided for an internal combustion engine having an intake system and an exhaust system installed to the front and back of the engine, respectively. The fuel pump is located adjacent to a front upper part of the engine so as to be driven by a camshaft, but is positioned in an inclined position relative to the engine instead of a vertical position. This arrangement shifts the fuel pump backward in installing position with an effect of eliminating mechanical interference of the fuel pump with an engine compartment hood, and provides a long distance between the fuel pump and a dash panel behind the fuel pump with an effect of lowing energy of an impact applied to the fuel pump from the dash panel when the engine moves rearward due to a front-end collision.

9 Claims, 10 Drawing Sheets

US 6,484,342 B2

FUEL SUPPLY DEVICE FOR DIRECT INJECTION ENGINE

BACKGROUND OF THE INVENTION

1. Field of the Invention

The present invention relates to a fuel supply device for a direct injection internal combustion engine and, more particular, to a fuel supply device for supplying fuel to a direct injection internal combustion engine in which a layout of a high-pressure fuel pump is improved.

2. Description of Related Art

In a front engine-front drive (FF) type of vehicle, an engine is installed in a front engine compartment with a row of cylinders in a transverse direction of the vehicle. As known from, for instance, Japanese Unexamined Patent Application No. 8-312502, in the case where the front engine-front drive type of vehicle equipped with a direct injection type of internal combustion engine in which fuel is sprayed directly into cylinders, a fuel supply device includes fuel injectors and a high-pressure fuel pump which is used to pressurize fuel and force it into a fuel delivery pipe for distributing fuel to the fuel injectors for stable fuel supply into cylinders through the fuel injectors overcoming high pressure in the cylinders.

Typically, a camshaft or an extension of the camshaft extending beyond an engine in a transverse direction drives a high-pressure fuel pump. Fuel is pressurized by, for example, reciprocating motion of a rod of the high-pressure fuel pump, which is caused by rotation of a cam secured to the camshaft. Because the front engine-front drive type of vehicle is equipped with an internal combustion engine with a row of cylinders directed in a transverse direction of the vehicle and, as a matter of course, the camshaft extends in the transverse direction, the high-pressure fuel pump is located laterally adjacent to the top of the transverse engine.

As schematically shown as one of general arrangements of intake and exhaust systems in FIG. 9, an intake system P2 is located behind a transverse direct injection engine P10 and an exhaust system P3 is located in front of the engine. Further, as schematically shown as another general arrangement of intake and exhaust systems in FIG. 10, an intake system P2 is located in front of engine P10 and an exhaust system P3 is located behind the engine. The latter arrangement makes it possible to have the exhaust system P3 shortened in exhaust gas path length for the purpose of quickly raising a temperature of a catalytic converter in the exhaust system P3 and accelerating activation of the catalyst which is quite notable in light of measures to meet the recent exhaust gas regulations.

In both arrangements, a high-pressure fuel pump P50 is located laterally adjacent to rear part of the top of the transverse engine so as to avoid mechanical interference against a front hood Pz that is inclined forward down. A camshaft extending from rear top portion of the engine body P10 drives the high-pressure fuel pump P50. Specifically, the high-pressure fuel pump P50 is driven by an intake camshaft P14 in the case where the intake system P2 is located behind the engine P2 as shown in FIG. 9, or the high-pressure fuel pump is driven by an exhaust camshaft P15 in the case where the exhaust system P3 is located behind the engine body P10 as shown in FIG. 10.

There is provided a distance between the high-pressure fuel pump P50 and a dash panel Pg when disposing the high-pressure fuel pump P50 a little to the rear of the engine P10 shorter than that when disposing the high-pressure fuel pump P50 a little to the front of the engine body P10 and driving it by a camshaft extending along froward top portion of the engine body P10. The shorter distance between the high-pressure fuel pump P50 and a dash panel Pg provides an increase in probability of damaging the high-pressure fuel pump P50 due to a hit against the dash panel Pg which is caused by rearward movement of the engine body P10 upon an occurrence of a frontal crash of the vehicle. In particular, differently from the arrangement in which the engine body P10 with the intake system P2 located behind the engine and the exhaust system P3 located in front of the engine as shown in FIG. 9, a surge tank P22 is not located between the high-pressure fuel pump P50 and the dash panel Pg in the arrangement in which the engine body P10 with the intake system P2 located in front of the engine and the exhaust system P3 located behind the engine as shown in FIG. 10. Accordingly, the high-pressure fuel pump P50 and the dash panel Pg stand face to face directly with each other, so that the high-pressure fuel pump P50 is apt to easily hit against the dash panel Pg when the engine moves backward. This arrangement is undesirable for structural safety.

SUMMARY OF THE INVENTION

It is an object of the present invention to provide a fuel supply device having a compact arrangement which prevents a high-pressure fuel pump from mechanically interfering with a hood of an engine compartment and provides a large distance between the high-pressure fuel pump and a structural member such as a dash panel behind the high-pressure fuel pump in consideration with prevention of an impact possibly applied to the high-pressure fuel pump upon occurrence of a frontal crash of the vehicle.

The foregoing object of the present invention is accomplished by providing a fuel supply device for a direct injection internal combustion engine with a row of cylinders directed in a transverse direction of a vehicle body for supplying fuel to fuel injectors adapted to spray fuel directly into cylinders, which comprises at least two camshafts extending in parallel to each other along the engine in the transverse direction and a high-pressure fuel pump for pressurizing said fuel and forcing it into the fuel injector. The high-pressure fuel pump is located laterally adjacent to front or rear part of the engine so as to be driven by one of the two camshafts located along the part of the engine and is installed in a position inclined forward or rearward.

According to the fuel supply device, in an arrangement wherein the high-pressure fuel pump E50 is located laterally adjacent to forward part of the engine body E10 and is driven by one of the two camshaft E14 which is located along the forward part of the engine body E10 as schematically shown in FIG. 7, because the high-pressure fuel pump P50 is not in an upright position but is inclined rearward, the high-pressure fuel pump E50 shifts rearward in position from the upright position, so that the high-pressure fuel pump E50 is prevented from mechanically interfering with the hood of engine compartment Ez though it is located in a forward position with respect to the engine body E10. Additionally, the high-pressure fuel pump E50 is intentionally positioned forward with respect to the engine body E10 in the engine compartment Ex, so that there is provided a long distance between the high-pressure fuel pump E10 and the dash panel Eg behind the high-pressure fuel pump E50, thereby lowering energy of an impact applied to the high-pressure fuel pump E50 by the dash panel Eg when the engine body E10 moves rearward upon an occurrence of frontal crash of the vehicle.

On the other hand, in an arrangement wherein the high-pressure fuel pump E50 is located laterally adjacent to rearward part of the engine body E10 and is driven by one of the two camshaft E15 which is located along the rearward part of the engine body E10 as schematically shown in FIG. 8, because the high-pressure fuel pump P50 is not in an upright position but is inclined forward, the high-pressure fuel pump E50 shifts forward in position from the upright position, so that there is provided a long distance between the high-pressure fuel pump E10 and the dash panel Eg behind the high-pressure fuel pump E50 even though it is located in a rearward position with respect to the engine body E10 thereby lowering energy of an impact applied to the high-pressure fuel pump E50 by the dash panel Eg when the engine body E10 moves rearward upon an occurrence of frontal crash of the vehicle. Additionally, the high-pressure fuel pump E50 is intentionally positioned rearward with respect to the engine body E10 in the engine compartment Ex, so that the high-pressure fuel pump E50 is prevented from mechanically interfering with the hood Ez of the engine compartment Ez.

If inclining forward the high-pressure fuel pump E50 located in a forward position, the high-pressure fuel pump E50 shifts into a more forward position from the originally intended upright position. This arrangement is hard to prevent the high-pressure fuel pump E50 from mechanically interfering with the hood Ez. Similarly, if inclining rearward the high-pressure fuel pump E50 located in a rearward position, the high-pressure fuel pump E50 shifts into a more rearward position from the originally intended upright position. This arrangement is hard to prevent the high-pressure fuel pump E50 from mechanically interfering with the hood Ez.

The fuel supply device shown in FIG. 7 or 8 is shown by way of example in which an engine is equipped with the intake system E2 disposed in front of the engine body E10 and the exhaust system E3 disposed behind the engine body E10 like the engine P10 shown as prior art in FIG. 10. In this arrangement, the high-pressure fuel pump E50 is driven by an intake camshaft E14 as shown in FIG. 7 or by an exhaust camshaft E15 as shown in FIG. 8. However, the fuel supply device of the present invention can be installed to such an engine P10 equipped with the intake system P2 disposed behind the engine body P10 and the exhaust system P3 located in front of the engine body P10 as shown as prior art in FIG. 9. This arrangement, in which the high-pressure fuel pump E50 is driven by an exhaust camshaft E15 as shown in FIG. 7 or by an intake camshaft E15 as shown in FIG. 8, provides the same effects as the former arrangement.

The fuel supply device includes the intake system and fuel injector may be installed to the front of the engine body, and the high-pressure fuel pump is located laterally adjacent to the forward part of the engine body so as to be driven by the intake camshaft and inclined rearward.

According to the fuel supply device, as shown in FIG. 7, in the arrangement in which the engine E10 is equipped with the exhaust system E3 disposed behind the engine body E10 for the purpose of accelerating activation of a catalytic converter device and the intake system E2 and a fuel injector E60, or a fuel delivery pipe E60 for delivering fuel to the fuel injector E60, disposed on the front side of the engine body E10, the high-pressure fuel pump E50 is driven not by the exhaust camshaft E15 located at the rear part of the engine body E10 but by the intake camshaft E14 located at the front part of the engine body E10, so as to make it possible to use various pipes Em and En made short in length between the high-pressure fuel pump E50 and the fuel injector E60 or the fuel delivery pipe E60 and, in consequence, to provide a reduction in pumping loss of the high-pressure fuel pump E50. The high-pressure fuel pump E50 has a fuel inlet port through which fuel is introduced in and a fuel discharge port through which pressurized fuel is discharged. Either one of the fuel inlet port and fuel discharge port may be located at the rear bottom of the high-pressure fuel pump in the inclined position. Further, a fuel return pipe E46 through which excessive low pressure fuel returns into the high-pressure fuel pump E50 may be connected to a back wall Ep facing rearward up of the high-pressure fuel pump inclined rearward.

According to the fuel supply device, as shown in FIG. 7, one of the fuel pipes, for example a pressurized fuel supply pipe E45, is connected to the rear bottom Eo of the high-pressure fuel pump E50 inclined rearward, so that the joint structure between the high-pressure fuel pump E50 and the pressurized fuel supply pipe E45 is directed toward the inside of the vehicle body. This arrangement significantly reduces an occurrence of such a trouble as the joint is damaged or breaking away due to an impact from the front or the top of the vehicle body.

In the case where the fuel discharge port to which the pressurized fuel supply pipe E45 is connected to supply pressurized fuel to the fuel injector E60 is located at the bottom of the high-pressure fuel pump E50 inclined rearward, the pressurized fuel supply pipe E45 and the joint between the high-pressure fuel pump E50 and the pressurized fuel supply pipe E45 are directed toward the inside of the vehicle body, so that the joint and the pressurized fuel supply pipe E45 are prevented from being damaged or breaking away from the high-pressure fuel pump E50 due to an impact from the front or the top of the vehicle body. In this arrangement, while a metal pipe is preferably used for the pressurized fuel supply pipe E45, a plastic pipe may be used for the fuel return pipe E46.

According to this arrangement in which a metal pipe and a plastic pipe are used for the pressurized fuel supply pipe E45 and the fuel return pipe E46, respectively, the pressurized fuel supply metal pipe E45 connected to the rear bottom Eo of the high-pressure fuel pump E50 has relatively low elasticity and lacks in flexibility and, on the other hand, the fuel return plastic pipe E46 connected to the back wall Ep facing rearward up of the high-pressure fuel pump E50 has relatively high elasticity and is flexible. Therefore, the joint between the high-pressure fuel pump E50 and the pressurized fuel supply metal pipe E45 through which highly pressurized fuel passes is directed toward the inside of the vehicle body, so that the joint and the pressurized fuel supply metal pipe E45 are prevented from being damaged or breaking away from the high-pressure fuel pump E50 due to an impact from the front or the top of the vehicle body, with increased reliability.

BRIEF DESCRIPTION OF THE DRAWINGS

The foregoing and other objects and features of the present invention will be understood from the following description in accordance with preferred embodiments thereof when reading in connection with the accompanying drawings in which parts and elements denoted by the same reference numbers are same or similar in structure and operation throughout the drawings, and wherein.

DETAILED DESCRIPTION OF THE PREFERRED EMBODIMENTS

Figure 1:
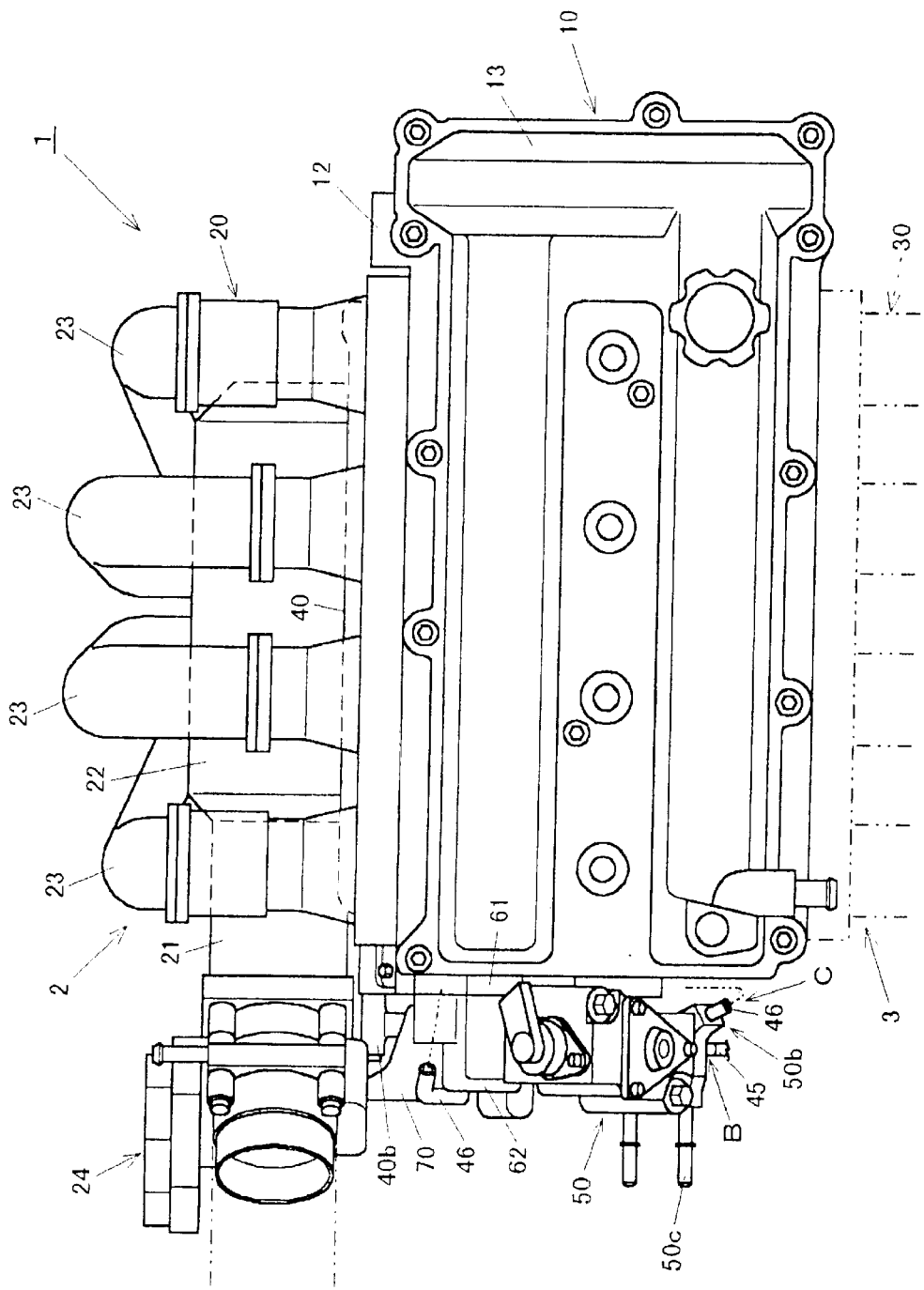
FIG. 1 is a plane view of a direct injection internal combustion engine and its associated equipment including a fuel supply device in accordance with an embodiment of the present invention.
Figure 2:
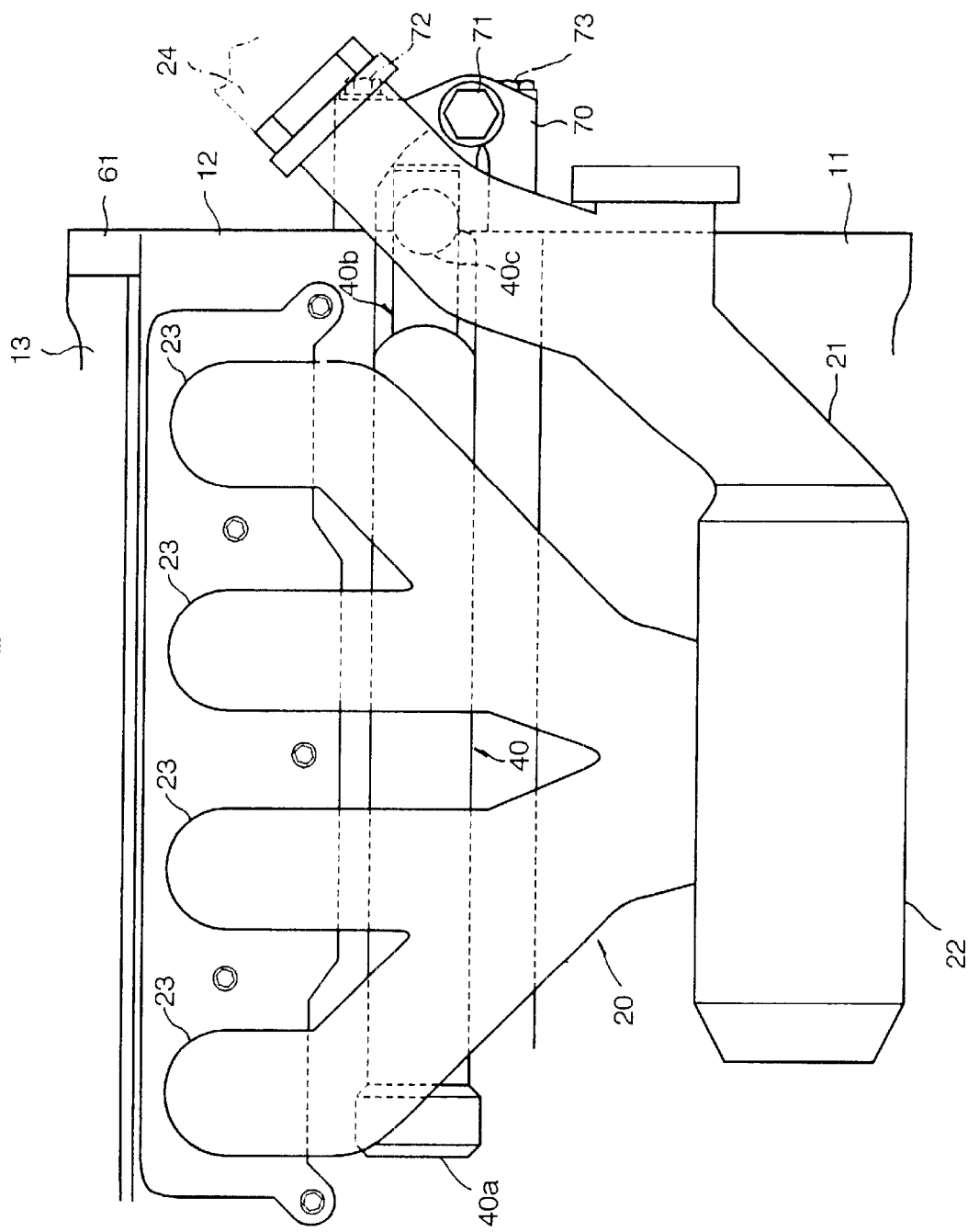
FIG. 2 is an elevation view of an intake manifold installed to the engine as viewed from the front of a vehicle body.
Figure 3:
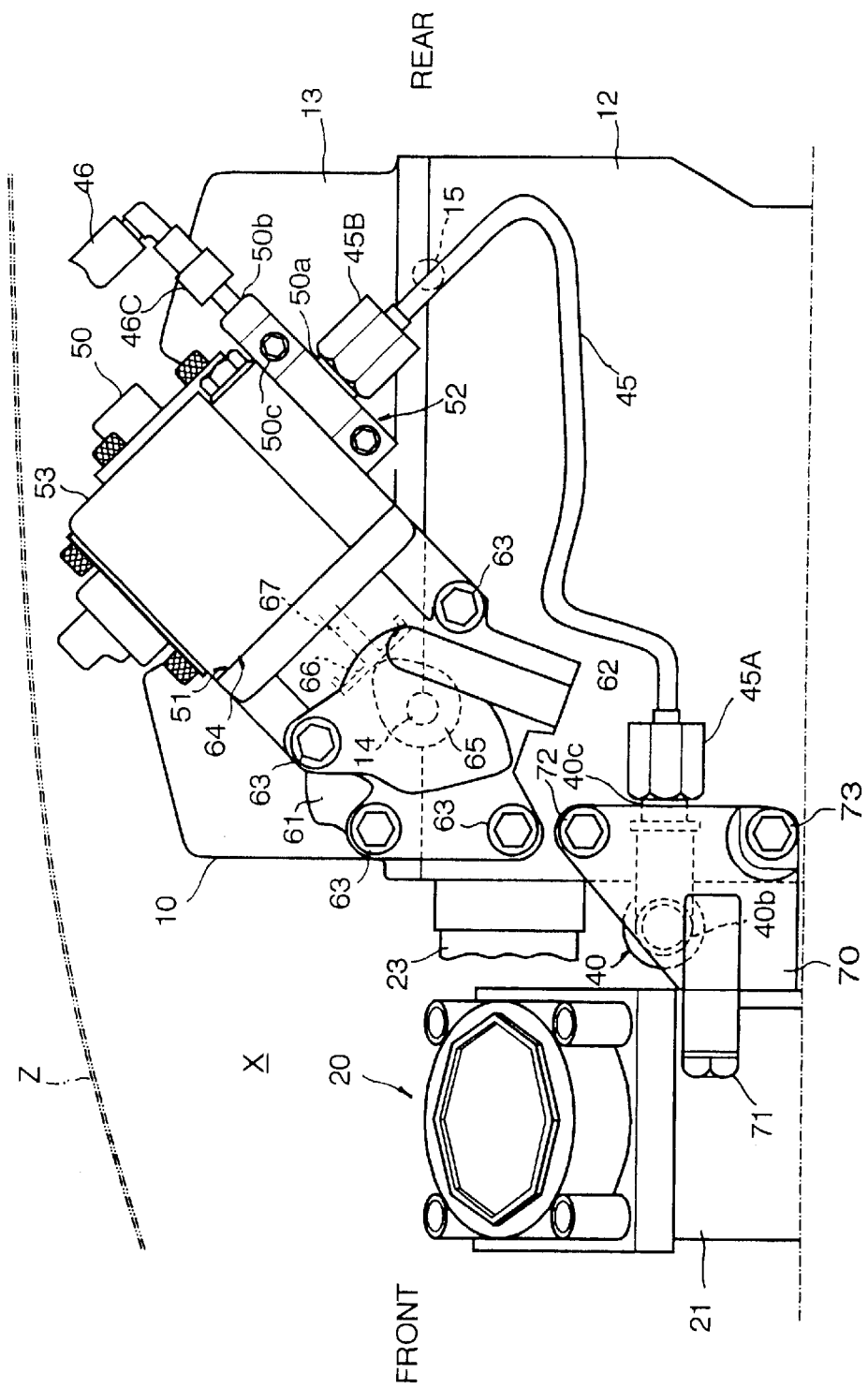
FIG. 3 is an enlarged elevation view of upper portion of the engine as viewed from the left side of the vehicle body.

Referring to the drawings in detail and, in particular, to FIGS. 1 to 3 showing an external appearance of an internal combustion engine 1 and its associated equipment including a fuel supply device in accordance with an embodiment of the present invention, the engine 1, which is of a direct injection in-line four cylinder type, has an engine body 10 mounted with a straight row of cylinders (not shown) directed in a transverse direction of a vehicle body (not shown) in a front engine compartment (which is labeled X in FIG. 3). An intake manifold 20 forming part of an intake system 2 is installed to a front of the engine body 10. An exhaust manifold 30 forming part of an exhaust system 3 is installed to a back of the engine body 10. This arrangement of the intake and exhaust systems 2 and 3 enables the exhaust system 2 to be shortened in path length as compared with an arrangement in which the exhaust manifold 30 is installed to the front of the engine body 10. A catalytic converter (not shown) in the exhaust system 3 owes its quick rise in temperature and accelerated activation after an engine start to the short path length of the exhaust system 3.

As shown in detail in FIG. 2, the engine body 10 comprises a cylinder block 11 forming a lower half of the engine body 10, a cylinder head 12 forming an upper half of the engine body 10 and a camshaft cover 13. The camshaft cover 13 covers and protects intake and exhaust camshafts 14 and 15 (see FIG. 3) extending in the transverse direction by which intake valves and exhaust valves (not shown) are opened and closed at given timings. The intake manifold 20 extends laterally from the left side of the engine body 10 and inclines upward. The intake manifold 20 has an upstream intake pipe 21 with a throttle body 24 secured to an upper part thereof, a surge tank 22 which is installed to the cylinder block 11 and to which a downstream end of the intake pipe 22 is secured, and discrete intake pipes 23 branching off upward from the surge tank 22 and leading to the cylinder head 12. Intake air, which is introduced into the upstream intake pipe 21 through an air cleaner (not shown), is controlled in amount by a throttle valve built in the throttle body 24 and supplied into the cylinders through the surge tank 22 and the respective discrete intake pipes 23. In this instance, the intake manifold 20 is made as a single plastic molding for the purpose of lightness in weight and the throttle body 24 is however made as a metal molding such as aluminum molding. Although the throttle body 24 is depicted by a solid line as being installed to the upstream intake pipe 21 of the intake manifold 20 FIG. 1, it is omitted in the remaining figures.

As shown in FIGS. 2 and 3, the engine body 10 is equipped with a fuel delivery pipe 40 and a high-pressure fuel pump 50 operative to pressurize fuel and to force it into the fuel delivery pipe 40. The fuel delivery pipe 40 is located right below an interface between the discrete pipes 23 and the cylinder head 12 and extends in the transverse direction in parallel to the cylinder head 12.

Figure 4:
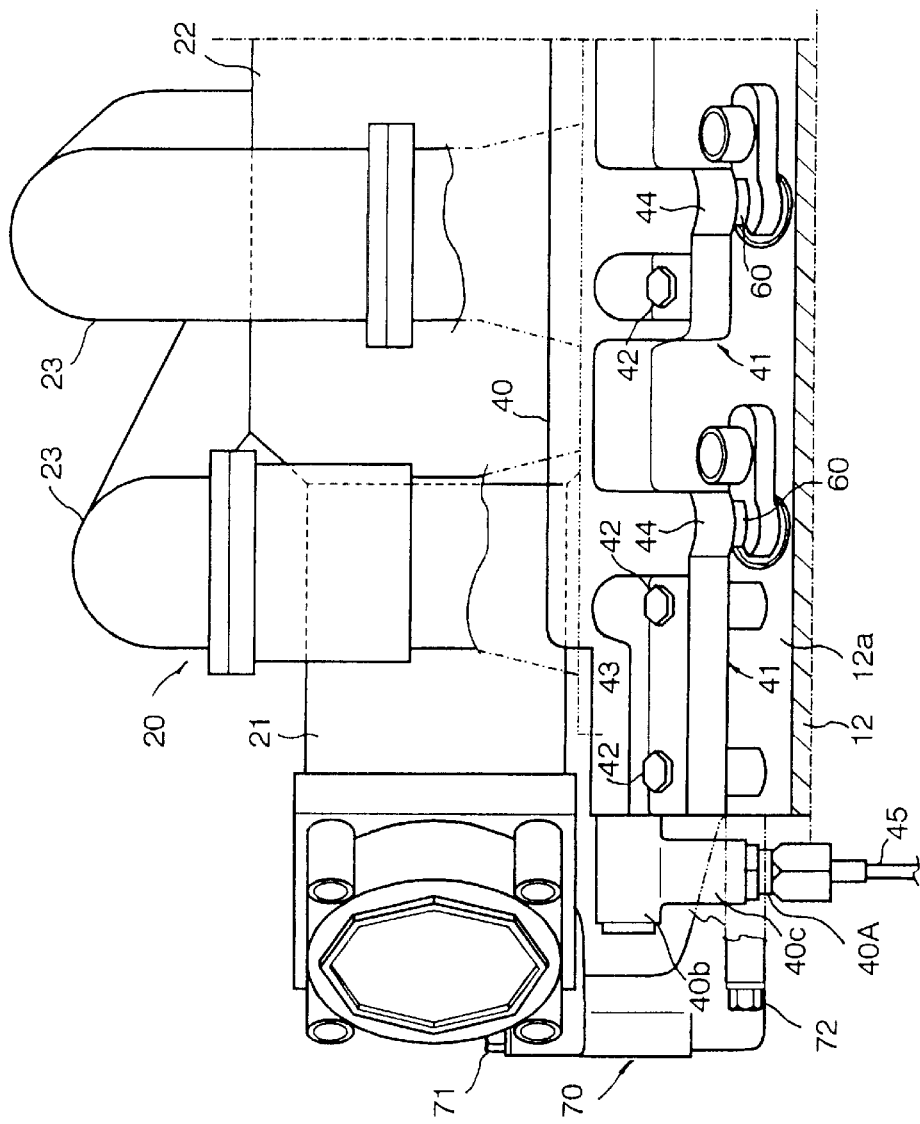
FIG. 4 is an enlarged plan view partly in cross-section of the front left of the engine.
Figure 5:
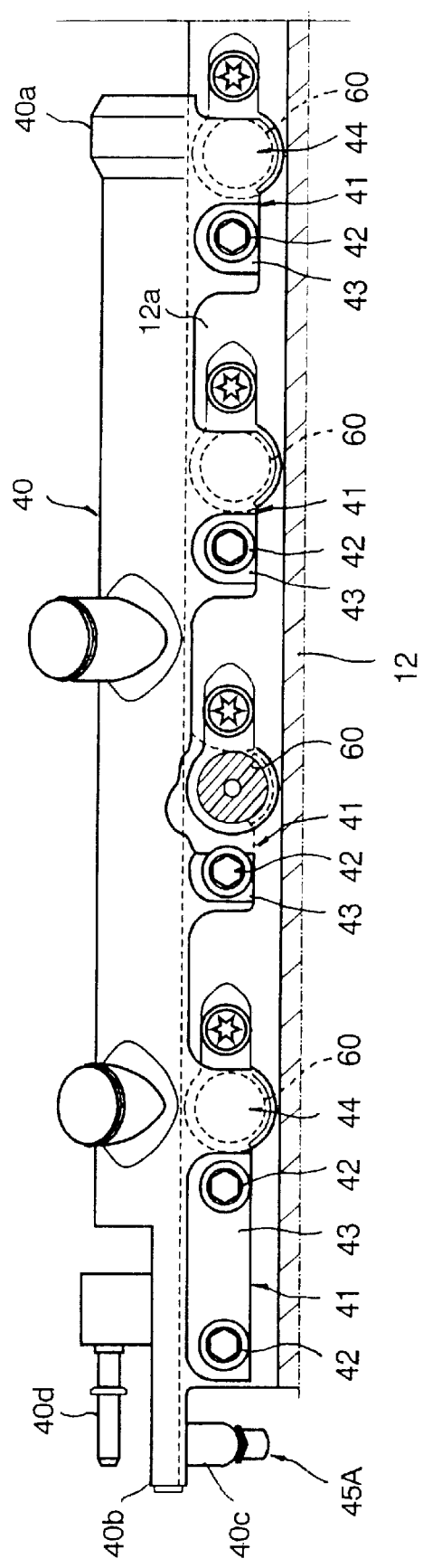
FIG. 5 is a view partly in cross-section and partly cut away of a fixing mechanism for fixing a fuel delivery pipe and fuel injectors to a cylinder head of the engine as viewed in a direction parallel to an inclined surface of the cylinder head.

FIGS. 4 and 5 show the cylinder head 12 broken away at its upper inclined corner surface 12a. In particular, FIG. 4 shows the top appearance of the cylinder head 12 as viewed from the above and FIG. 5 shows an appearance of the cylinder head 12 as viewed along a direction parallel to the inclined surface 12a of the upper corner. The fuel delivery pipe 40 is formed with four lugs 41 laterally extending toward the cylinder head 12. The fuel delivery pipe 40 at the lugs 41 is secured to the upper inclined corner surface 12a of the cylinder head 12 at the front side by bolts 42. The lug 41 has a fixture portion 43 at which the bolts 42 are fastened and a fuel delivery portion 44 adjacent to the fixture portion 43. The fuel delivery portion 44 is formed with a fuel outlet port (not shown). A fuel injector 60, which has a nozzle installed in the cylinder head 12 so as to spray pressurized fuel accumulated in the fuel delivery pipe 40 directly into the cylinder, is fitted in the fuel outlet port of the fuel delivery portion 44 of the lug 41. The fuel delivery pipe 40 is closed at both end 40a and fuel inlet end 40b. As seen in FIGS. 3 through 5, the fuel delivery pipe 40 is integrally formed with a fuel delivery pipe extension 40c adjacent to one, for example the left fuel inlet end 40b as viewed in FIGS. 4 and 5, of the opposite closed ends. The fuel delivery pipe extension 40c extends rearward in a lengthwise direction of the vehicle body from the fuel delivery pipe 40. The high-pressure fuel pump 50 is connected to the fuel delivery pipe extension 40c of the fuel delivery pipe 40 through a pressurized fuel supply pipe 45 so as to supply pressurized fuel into the fuel delivery pipe 40. The pressurized fuel supply pipe 45 is connected at one of opposite ends to the fuel delivery pipe extension 40c of the fuel delivery pipe 40 by a pipe joint 45A and is connected at another end to a fuel discharge port 50a of the high-pressure fuel pump 50 by a pipe joint 45B.

Referring back to FIGS. 1 through 3, the high-pressure fuel pump 50 additionally has a fuel return port 50b through which excessive low pressure fuel returns into the high-pressure fuel pump 50 from the fuel delivery pipe 40 and a fuel inlet port 50c through which fuel is supplied into the high-pressure fuel pump 50 from a fuel tank (not shown). A low pressure fuel return pipe 46 is connected to the fuel return port 50b of the high-pressure fuel pump 50 by a pipe joint 46C and to a fuel delivery pipe extension 40d (see FIG. 5) adjacent to the fuel delivery pipe extension 40c. The high-pressure fuel pump 50 is driven by the intake camshaft 14 positioned in front of the exhaust camshaft 15. The intake camshaft 14 extends beyond one side, namely the left sides, of the cylinder head 12 and the camshaft cover 13. The cylinder head 12 at the left side top is provided with a cam cap 61 laterally adjacent to the left side wall of the camshaft cover 13. The intake camshaft 14 at the left end portion is born for rotation between the cam cap 61 and the cylinder head 12. A cam housing 62 is installed to the cam cap 61 and the cylinder head 12 by a plurality of bolts 63 to cover and protect the left end of the intake camshaft 14. The cam housing 62 is provided with a fitting surface 64 inclined rearward so as to meet a fitting surface 51 of the high-pressure fuel pump 50. The intake camshaft 14 at the left end is fixedly provided with a drive cam 65. While the drive cam 65 rotates, it reciprocally moves up and down a rod 67 of the high-pressure fuel pump 50 through a tappet 66 installed within the cam housing 62, so that the high-pressure fuel pump 50 pressurizes fuel to a desired level. The pressurized fuel is discharged therefrom through the fuel discharge port 50a and then supplied into the delivery pipe 40 through the pressurized fuel supply pipe 45. While the pressurized fuel supply pipe 45 is made of a metal pipe for the purpose of withstanding the pressurized fuel flowing therethrough, the low pressure fuel return pipe 46 may be of a plastic pipe because fuel flowing therethrough is at low pressure. The plastic fuel return pipe 46 satisfies the lightness in weight of the engine body 10. The pressurized fuel supply pipe 45 made of metal is connected to the fuel discharge port 50a positioned at the bottom 52 of the high pressure discharge pump 50 inclined rearward by the pipe joint 45B. The low pressure fuel return pipe 46 made of plastic is connected to the fuel return port 50b positioned at the upper back 53 of the high pressure discharge pump 50 inclined forward by the pipe joint 45C.

Figure 6:
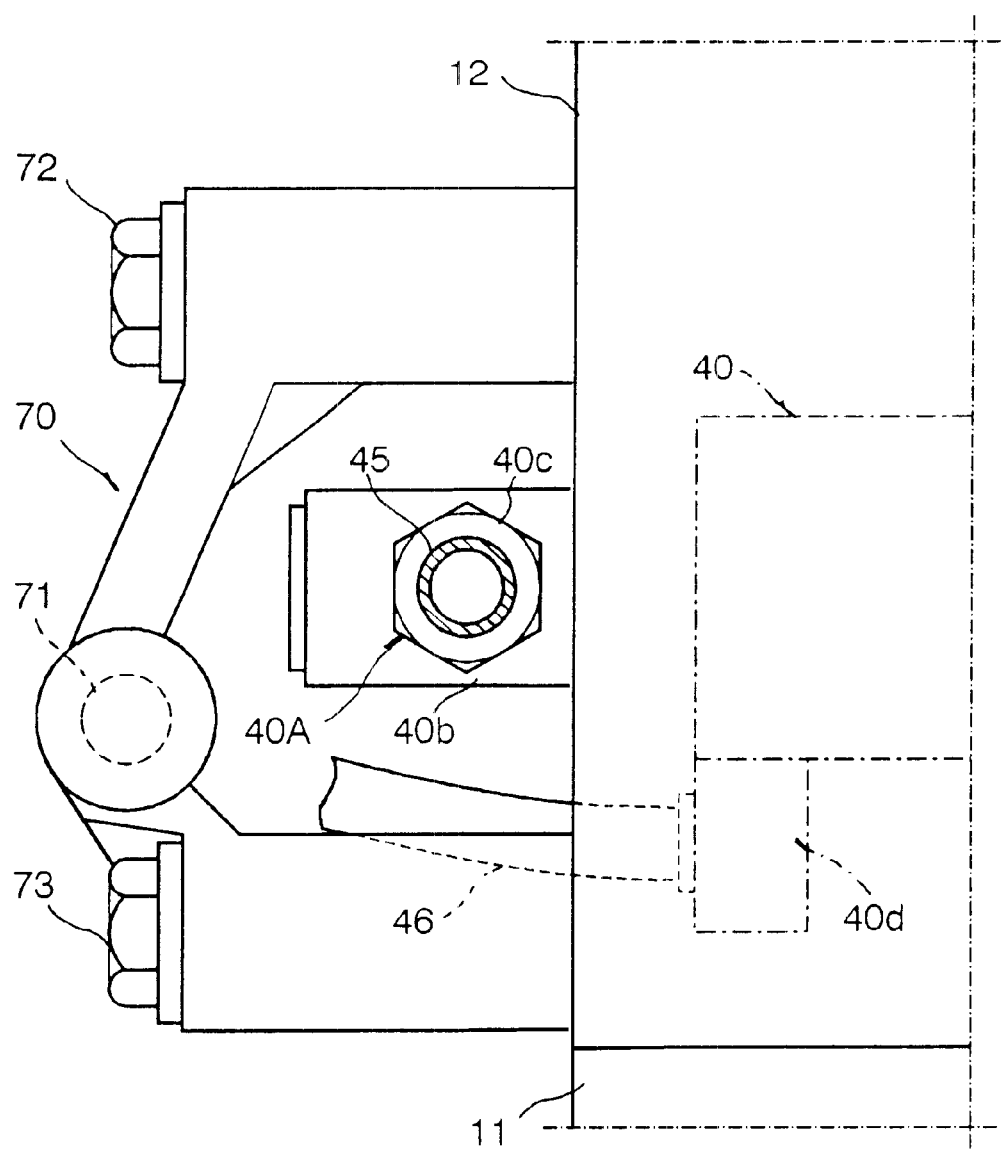
FIG. 6 is an elevation view of a surrounding structure of the left end part of the fuel delivery pipe as viewed from the back of the vehicle body.

As shown in FIGS. 3, 4 and 6, the cylinder head 12 at the left side is provided with a stay 70 for primarily supporting the upstream intake pipe 21 of the intake manifold 20. Specifically, because, while the upstream intake pipe 21 is provided with the throttle body 24 made of a metal secured to the upper part thereof, the upstream intake pipe 21 itself is made of a plastic molding, the upstream intake pipe 21 extending and inclining rearward up is securely supported by the stay 70 so that it is prevented from wavering. For preventing the upstream intake pipe 21 from wavering, the upstream intake pipe 21 at its upper end is secured to the stay 70 by a bolt 71 extending in the lengthwise direction and the stay 70 is secured to the cylinder head 12 by upper and lower bolts 72 and 73. In this instance, the stay 70 between the upper and lower bolts 72 and 73 covers the fuel inlet end portion 40b and pipe extension 40c of the fuel delivery pipe 40 and the pipe joint 45A between the pipe extension 40c of the fuel delivery pipe 40 and the pressurized fuel supply pipe 45 so as to protect them from an external impact from the left of the vehicle body.

Figure 7:
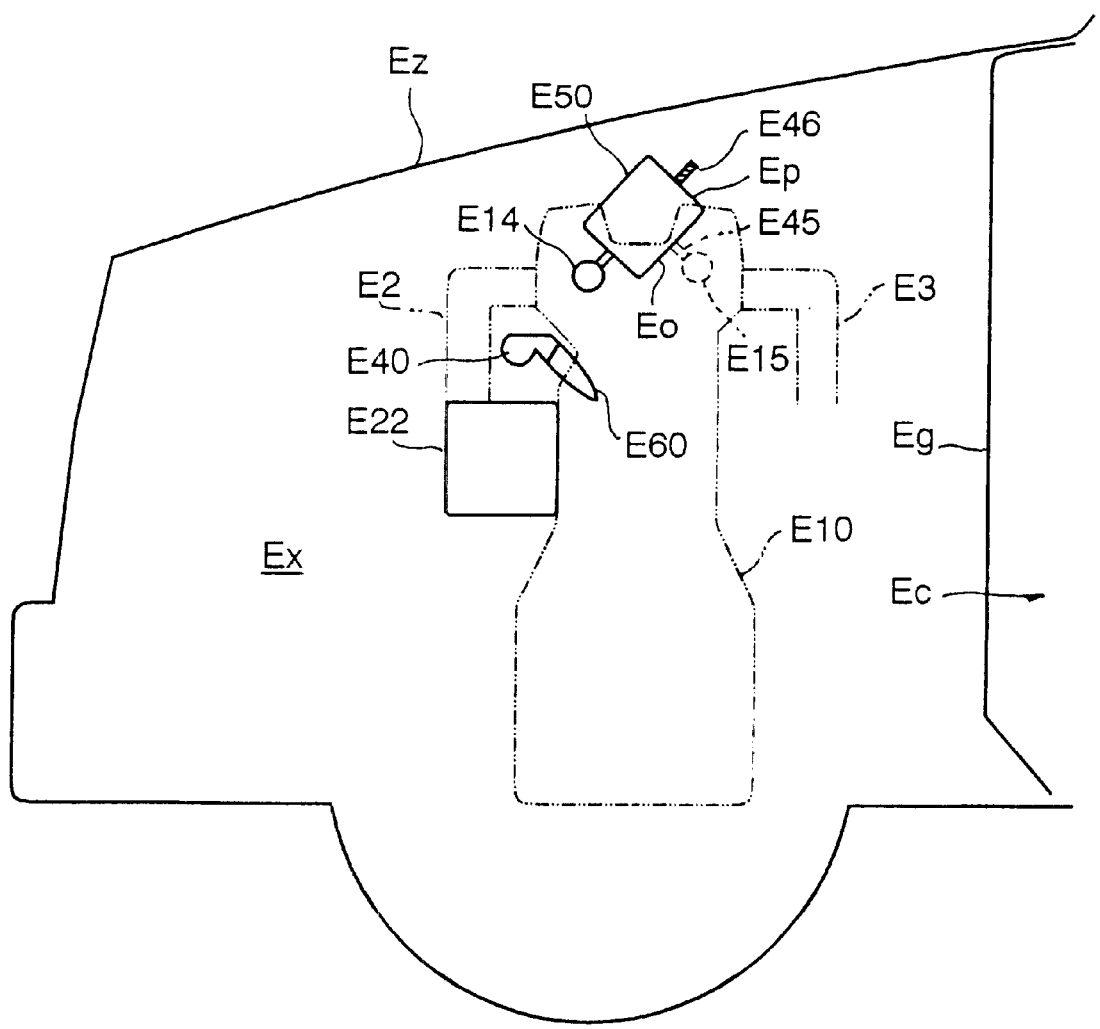
FIG. 7 is a schematic view of the fuel supply device according to an embodiment of the present invention.
Figure 8:
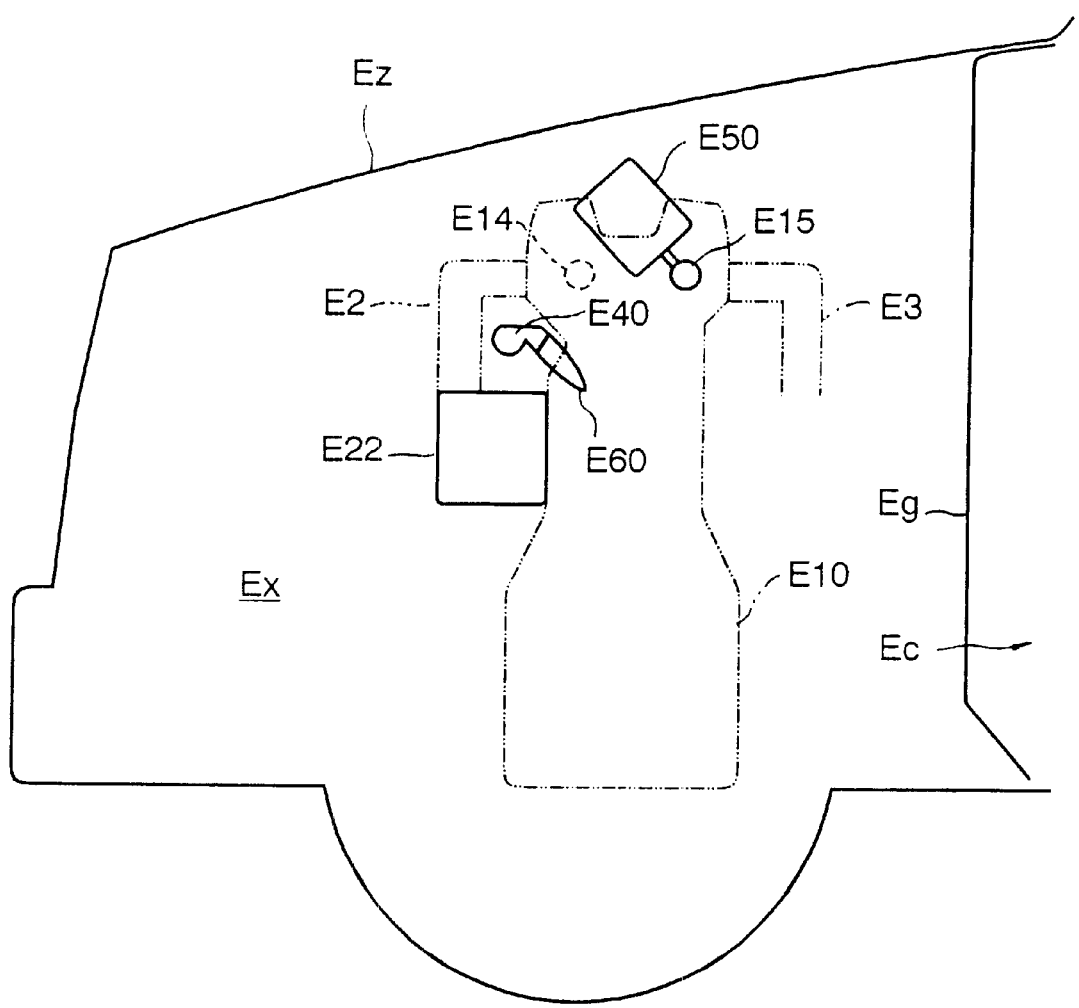
FIG. 8 is a schematic view of the fuel supply device according to another embodiment of the present invention.
Figure 9:
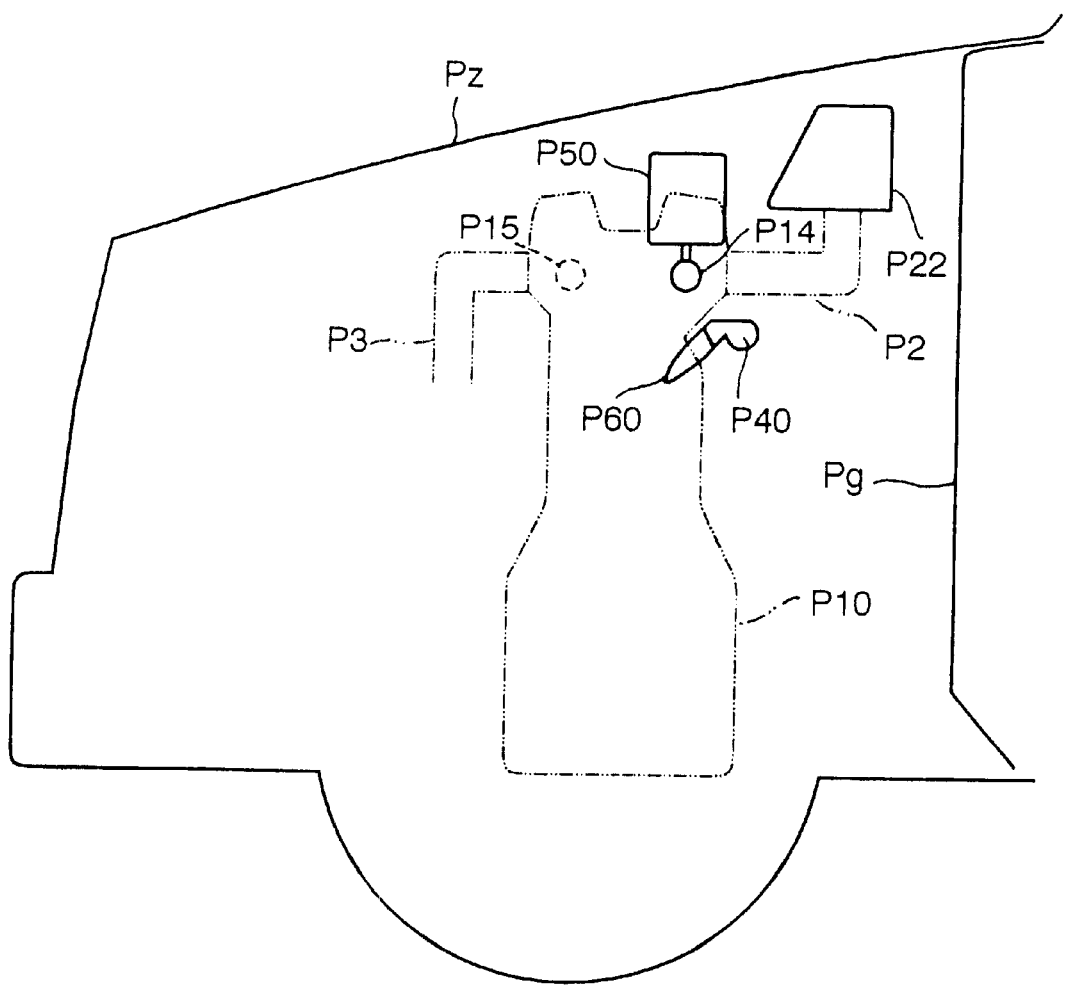
FIG. 9 is a schematic view of a prior art arrangement of a high-pressure fuel pump as viewed from the left of a vehicle body.
Figure 10:
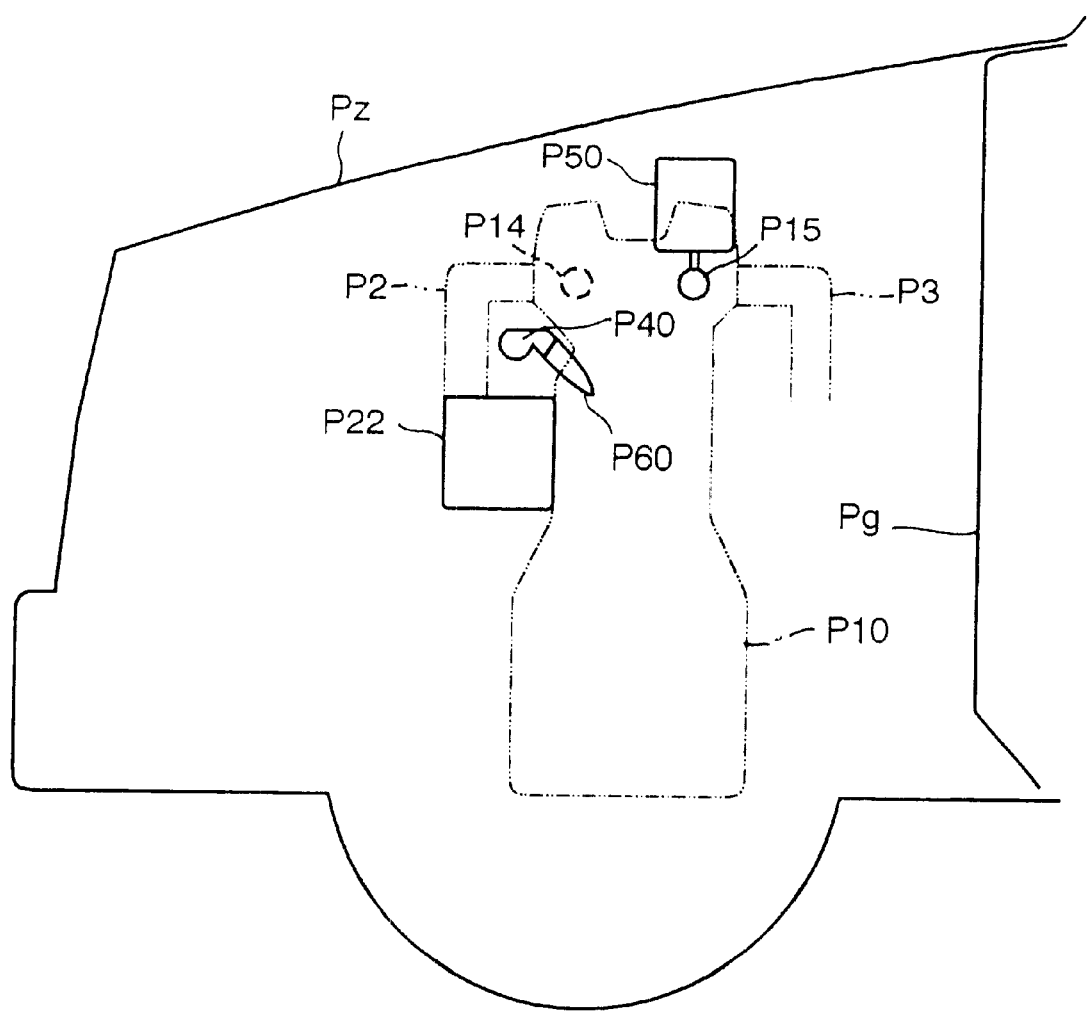
FIG. 10 is a schematic view of another prior art arrangement of a high-pressure fuel pump as viewed from the left of a vehicle body.

As apparent from the above, in the arrangement of the fuel supply device having the high-pressure fuel pump 50 driven by the intake camshaft 14 located forward with respect to the exhaust camshaft 15, since the high-pressure fuel pump 50 is located behind but near the front side of the engine body 10 and, in addition, is inclined rearward, the position in which the high-pressure fuel pump 50 is located is shifted backward as shown in FIG. 3 and the highest position of the high-pressure fuel pump 50, which is adjacent to the center depression of the camshaft cover 13, is lowered, so that there is no interference between the high-pressure fuel pump 50 and a hood Z of the front engine compartment X. The high-pressure fuel pump 50 is originally positioned behind but near the front side of the engine body 10, so that there is provided a long distance between the high-pressure fuel pump 50 and the dash panel Eg (see FIGS. 7 and 8) by which the front engine compartment X is separated from a passenger compartment Ec (see FIGS. 7 and 8).

The arrangement of the high-pressure fuel pump 50 lowers energy of an external impact that the high-pressure fuel pump 50 receives from the dash panel when the engine 1 or the engine body 10 moves rearward due to an external impact from the front. The arrangement in which the fuel injectors 60, fuel delivery pipe 40 and high-pressure fuel pump 50 are arranged together in the intake system 2 provides a short distance between the high-pressure fuel pump 50 and the fuel inlet end 40b of the fuel delivery pipe 40. This allows to use short lengths of the pressurized fuel supply pipe 45 and the low pressure fuel return pipe 46 with an effect of providing a decrease in pumping loss of the high-pressure fuel pump 50. In addition, the distance between the high-pressure fuel pump 50 and the fuel inlet end 40b of the fuel delivery pipe 40 is shortened owing to the arrangement in which the high-pressure fuel pump 50 and both the fuel inlet end 40b and the fuel delivery pipe extension 40c extending laterally from the fuel inlet end 40c of the fuel delivery pipe 40 are installed to the engine body 10 on the left side of the cylinder head 12. This also allows to use short lengths of pressurized fuel supply pipe 45 and the low pressure fuel return pipe 46 with an effect of providing a decrease in pumping loss of the high-pressure fuel pump 50.

Furthermore, the fuel delivery pipe 40 and the high-pressure fuel pump 50 are installed to the engine body 10 so that the fuel discharge port 50a and fuel return port 50b of the high-pressure fuel pump 50 and the pipe joints 45B and pipe joint 46C connecting the pressurized fuel supply pipe 45 and low pressure fuel return pipe 46 to the high-pressure fuel pump 50, respectively, are directed rearward. This rearward directed arrangement protects the joint structure from receiving an external impact applied to the vehicle body from the front. In particular, the high-pressure fuel pump 50, and hence the pipe joints 45B and 45C connecting the pressurized fuel supply pipe 45 made of a metal, which is low in elasticity, and the low pressure fuel return pipe 46 made of a plastic, which is high in elasticity, to the bottom 52 and upper back 53 of the high-pressure fuel pump 50, respectively, are inclined rearward. This rearward directed arrangement puts the pipe joint 45B between the high pressure fuel metal pipe 45 deficient in flexibility and the high-pressure fuel pump 50 in a direction toward the inside of the vehicle body, as a result of which the pipe joint 45B is prevented from damages, or otherwise prevented from being dislocated, due to an external impact applied to the vehicle body from the top or the front.

Although the above description is directed to the embodiment in which the high-pressure fuel pump 50 is installed to the engine 1 with the intake system 2 located on the front side of the engine body 10 and the exhaust system 3 located behind the engine body 10 with the intention of promoting activation of the catalyst, in the case where the engine is provided with the intake system 2 and the exhaust system 3 located behind and in front of the engine body 10, respectively, it is preferred to dispose the high-pressure fuel pump 50 on the side of the intake system 2 and to incline it forward from an originally intended upright position so as to drive it by the intake camshaft 14 behind the exhaust camshaft 15. This arrangement of the high-pressure fuel pump 50 provides a short distance between the high-pressure fuel pump 50 and the fuel inlet end 40b of the fuel delivery pipe 40 as well. This allows to use short lengths of the pressurized fuel supply pipe 45 and the low-pressure fuel return pipe 46. In addition, in this arrangement the high-pressure fuel pump 50 is shifted forward from the originally intended upright position, so as thereby to provide a long distance of the high-pressure fuel pump 50 from the dash panel. In this case, the high-pressure fuel pump 50 is originally located in a rather rearward position in the engine compartment, there is no mechanical interference of the high-pressure fuel pump 50 with the hood of the front engine compartment.

As described above in detail, according to the fuel injection device for a direct injection engine of the present invention in which the high-pressure fuel pump operative to pressurize fuel and force it to the fuel injectors through the fuel delivery pipe is located so as to be driven by the camshaft or an extension of the camshaft, namely the intake camshaft or the exhaust camshaft, extending along the engine body, while the high-pressure fuel pump is put in position to avoid causing mechanical interference with the hood of the front engine compartment and, in consequence, it provides itself with a long distance from a structural member of the vehicle body, such as a dash panel, located directly behind it, so as thereby to prevent itself from receiving strong energy of an external impact from the structural member when the engine body moves rearward. In consequence, the high-pressure fuel pump is protected from being damaged or breaking down.

Although the fuel supply device for a direct injection type of internal combustion engine of the present invention has been described in detail in relation to the embodiment in which the high-pressure fuel pump 50 and the fuel inlet end 40b and fuel delivery pipe extension 40c of the fuel delivery pipe 40 are located on the left side of the engine body, they are not limited to the left side location but can be located on the right side of the engine body 10 with the same effects described above. In addition, the fuel supply device for a direct injection type of internal combustion engine of the present invention is widely implemented in general engines with a high-pressure fuel pump driven by a camshaft extending along the engine.

It is to be understood that although the present invention has been described with regard to various preferred embodiments thereof, various other embodiments and variants may occur to those skilled in the art, which are within the scope and spirit of the invention, and such other embodiments and variants are intended to be covered by the following claims.

What is claimed is:

1. A fuel supply device for supplying fuel to fuel injectors operative to spray fuel into cylinders of a direct injection internal combustion engine in a straight row in a transverse direction of a vehicle body, said fuel supply device comprising:
    a first camshaft located on a front side of the direct injection internal combustion engine and extending in said transverse direction of said vehicle body over said direct injection internal combustion engine;
    a second camshaft extending on a rear side of and in parallel to said first camshaft over said direct injection internal combustion engine;
    a high-pressure fuel pump for pressurizing said fuel and forcing said pressurized fuel into said fuel injectors, said high-pressure fuel pump being located adjacent to part of said direct injection internal combustion engine at a front side of said direct injection internal combustion engine in a lengthwise direction of said vehicle body so as to be driven by said first camshaft; and
    a pump drive cam located below said high-pressure fuel pump so as to be driven by said first camshaft to drive said high-pressure fuel pump;
    wherein said high-pressure fuel pump is inclined rearward in said lengthwise direction so as to have a top thereof in the rear of a bottom thereof in said lengthwise direction.

2. A fuel supply device as defined in claim 1, wherein said fuel injectors are installed to said direct injection internal combustion engine in a position at said front side of said vehicle body, and said high-pressure fuel pump is located in said position.

3. A fuel supply device as defined in claim 2, wherein said first camshaft is an intake camshaft and said second camshaft is an exhaust camshaft.

4. A fuel supply device as defined in claim 2, wherein said high-pressure fuel pump has an fuel inlet port through which said high-pressure fuel pump is supplied with said fuel and a fuel discharge port through which said high-pressure fuel pump discharges said fuel, at least one of said fuel inlet port and said fuel discharge port being located at a bottom of said high-pressure fuel pump.

5. A fuel supply device as defined in claim 2, and further comprising a fuel supply pipe connected to said fuel discharge port located at said bottom of said high-pressure fuel pump, wherein said high-pressure fuel pump supplies said pressurized fuel to said fuel injectors through said pressurized fuel supply pipe.

6. A fuel supply device as defined in claim 5, wherein said pressurized fuel supply pipe is made of a metal pipe.

7. A fuel supply device for supplying fuel to fuel injectors installed to a direct injection internal combustion engine so as to spray fuel directly into cylinders of said direct injection internal combustion engine arranged in a straight row in a transverse direction of a vehicle body, said fuel supply device comprising:
    at least two camshafts extending in parallel to each other in said transverse direction of said vehicle body over said direct injection internal combustion engine;
    a high-pressure fuel pump for pressurizing said fuel and forcing said pressurized fuel into said fuel injectors, said high-pressure fuel pump being located adjacent to part of said direct injection internal combustion engine at a front side of said direct injection internal combustion engine in a lengthwise direction of said vehicle body so as to be driven by one of said two camshafts which is located on said part of said direct injection internal combustion engine in said position and is inclined rearward in said lengthwise direction;
    a fuel supply pipe connected to a fuel discharge port located at a bottom of said high-pressure fuel pump; and
    a fuel return pipe connected to a fuel return port located at an upper back of said high-pressure fuel pump, wherein said high-pressure fuel pump supplies said pressurized fuel to said fuel injectors through said pressurized fuel supply pipe and receives low pressure fuel returning from said fuel injectors through said fuel return pipe.

8. A fuel supply device as defined in claim 7, wherein said fuel return pipe is made of a plastic pipe.

9. A fuel supply device for supplying fuel to fuel injectors operative to spray fuel directly into cylinders of a direct injection internal combustion engine arranged in a straight row in a transverse direction of a vehicle body, said fuel supply device comprising:
    a first camshaft extending in said transverse direction of said vehicle body over said direct injection internal combustion engine;
    a second camshaft extending in parallel to said first camshaft and located on a front side of said first camshaft over said direct injection internal combustion engine;

a high-pressure fuel pump for pressurizing said fuel and forcing said pressurized fuel into said fuel injectors, said high-pressure fuel pump being located adjacent to part of said direct injection internal combustion engine at a rear side of said direct injection internal combustion engine in a lengthwise direction of said vehicle body so as to be driven by said second camshaft;

a pump drive cam located below said high-pressure fuel pump so as to be driven by said first camshaft to drive said high-pressure fuel pump, wherein said high-pressure fuel pump is inclined forward in a lengthwise direction of said vehicle body so as to have a top thereof in front of a bottom thereof in said lengthwise direction.

* * * * *